(12) United States Patent
Handte et al.

(10) Patent No.: US 10,852,387 B2
(45) Date of Patent: *Dec. 1, 2020

(54) METHOD AND SYSTEM FOR DETERMINING A LOCATION OF A CLIENT DEVICE, A CLIENT DEVICE APPARATUS AND A NETWORK DEVICE APPARATUS

(71) Applicant: Sony Corporation, Tokyo (JP)

(72) Inventors: Thomas Handte, Filderstadt (DE); Daniel Schneider, Stuttgart (DE); Ben Eitel, Gaertringen (DE)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,110

(22) Filed: Aug. 8, 2019

(65) Prior Publication Data

US 2020/0011963 A1 Jan. 9, 2020

Related U.S. Application Data

(63) Continuation of application No. 15/735,975, filed as application No. PCT/EP2016/064568 on Jun. 23, 2016, now Pat. No. 10,416,279.

(30) Foreign Application Priority Data

Jun. 25, 2015 (EP) ..................................... 15173758

(51) Int. Cl.
*H04W 64/00* (2009.01)
*G01S 5/10* (2006.01)
(Continued)

(52) U.S. Cl.
CPC .............. *G01S 5/10* (2013.01); *G01S 5/0226* (2013.01); *H04W 64/00* (2013.01); *H04W 84/12* (2013.01)

(58) Field of Classification Search
CPC ....... H04W 64/00; H04W 4/023; H04W 4/02; H04W 84/12; H04W 84/18; H04W 40/20; H04W 4/50; H04W 4/70; H04W 8/26
See application file for complete search history.

(56) References Cited

U.S. PATENT DOCUMENTS

2004/0102198 A1 5/2004 Diener et al.
2007/0115842 A1 5/2007 Matsuda et al.
(Continued)

FOREIGN PATENT DOCUMENTS

DE 10 2013 021 439 A1 7/2014
GB 2513211 A 10/2014
WO 2015/031031 A1 3/2015

OTHER PUBLICATIONS

Extended European Search Report dated Jun. 5, 2019, issued in corresponding European Patent Application No. 19174263.4.
(Continued)

*Primary Examiner* — Jean A Gelin
(74) *Attorney, Agent, or Firm* — Xsensus LLP (57) ABSTRACT

A method for determining a location of a client device in a wireless network including the client device and at least three network devices, each of the three network devices having a known location comprises a pairwise exchanges of messages between at least three different pairs of network devices of said at least three network devices. In the pairwise exchange messages, wherein in a pairwise message exchange time difference information of the time difference between reception of a message and subsequent transmission of a message is included. This time difference information is used in the determination of the location of the client device.

15 Claims, 4 Drawing Sheets

(51) Int. Cl.
G01S 5/02 (2010.01)
H04W 84/12 (2009.01)

(56) References Cited

U.S. PATENT DOCUMENTS

| | | | | |
|---|---|---|---|---|
| 2011/0268097 | A1* | 11/2011 | Agrawala | H04W 56/002 370/338 |
| 2013/0106657 | A1 | 5/2013 | Perthold et al. | |
| 2013/0170374 | A1* | 7/2013 | Aljadeff | G01S 5/14 370/252 |
| 2014/0187259 | A1 | 7/2014 | Kakani et al. | |
| 2014/0204793 | A1 | 7/2014 | Ben-Haim et al. | |
| 2014/0233550 | A1* | 8/2014 | Hansen | H04W 4/023 370/338 |
| 2014/0269549 | A1 | 9/2014 | Stephens et al. | |
| 2015/0063228 | A1 | 3/2015 | Aldana | |
| 2015/0382143 | A1 | 12/2015 | Lindskog et al. | |
| 2015/0382152 | A1 | 12/2015 | Lindskog et al. | |
| 2016/0097850 | A1* | 4/2016 | Do | G01S 5/021 342/464 |
| 2016/0227473 | A1 | 8/2016 | Bhanage et al. | |
| 2016/0249165 | A1 | 8/2016 | Aldana | |
| 2016/0262122 | A1 | 9/2016 | Aldana | |

OTHER PUBLICATIONS

Time-Sensitive Networking Task Goup of IEEE 802.1, "IEEE P802.1 AS-Rev/D1 .0 Draft Standard for Local and Metropolitan Area Networks—Timing and Synchronization for Time-Sensitive Applications", XP068089464, (May 15, 2015), pp. 1-352.

Lindskog, et al., "Client Positioning using Timing Measurements between Access Points," IEEE 802.11, doc.: IEEE 802.11-13/0072r1, 2013. [Online]. Available: https://mentor.ieee.org/802.11/dcn/13/11-13-0072-01-000m-client-positioning-using-timing-measurements-between-access-points.pptx. [Accessed Apr. 2015], (Nov. 30, 2017), Total 13 pages.

Segev, et al., "Next Generation Positioning: Beyond Indoor Navigation," IEEE 802.11, doc.: IEEE 11-14/1193r0, Sep. 2014. [Online]. Available: https://mentor.ieee.org/802.11/dcn/14/11-14-1193-01-0wng-beyond-indoor-navigation.pptx. [Accessed Apr. 2015], (Sep. 2014), Total 30 pages.

Figueiras, et al."Mobile Positioning and Tracking: From Conventional to Cooperative Techniques", John Wiley & Sons Ltd. (2010), Total 288 pages.

IEEE P802.11 REVmc™ D8.0, 802.11 Working Group of the LAN/MAN Standards Committee of the IEEE Computer Society, "Draft Standard for Information technology—Telecommunications and information exchange between systems Local and metropolitan area networks—Specific requirements", Part 11: Wireless LAN Medium Access Control (MAC) and Physical Layer (PHY) Specifications, (Aug. 2016), Total 3774 pages.

International Search Report and Written Opinion dated Sep. 20, 2016 in PCT/EP2016/064568 filed Jun. 23, 2016.

Segev, et al., "Next Generation Positioning: Overview and Challenges," IEEE 802.11, doc.: IEEE 11-14/1464r0, Nov. 2014, [Online]. Available: https://mentor.ieee.org/802.11/dcn/14/11-14-1464-02-0wng-ng-positioning-overview-and-chalanges.pptx. [Accessed Apr. 2015], (Nov. 2014), Total 28 pages.

* cited by examiner

METHOD AND SYSTEM FOR DETERMINING A LOCATION OF A CLIENT DEVICE, A CLIENT DEVICE APPARATUS AND A NETWORK DEVICE APPARATUS

CROSS REFERENCE TO RELATED APPLICATIONS

This application is a continuation of U.S. application Ser. No. 15/735,975, filed Dec. 13, 2017, which is based on PCT filing PCT/EP2016/064568, filed Jun. 23, 2016, and claims priority to EP 15173758.2, filed Jun. 25, 2015, the entire contents of each are incorporated herein by reference.

BACKGROUND

Field of the Disclosure

The present disclosure relates to a method and system for determining a location of a client device in a wireless network including the client device and at least three network devices, each of the three network devices having a known location. The present disclosure relates further to a client device, a network device and corresponding methods.

Description of Related Art

In the future, indoor positioning is expected to gain an increasing market demand. In particular, indoor positioning based on WLAN (wireless local area network; sometimes also referred to as WiFi) messages is promising, because WLAN has a large market penetration and is included in various products.

Known positioning techniques for wireless devices (i.e. client devices) rely on a message exchange between network devices and the client device.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a method and system for determining a location of a client device in a wireless network with increased efficiency, particularly with respect to measurement rate, data traffic, energy consumption, capacity and/or accuracy. It is a further object to provide a client device, a network device as well as corresponding methods, a corresponding computer program for implementing a disclosed method and a non-transitory computer-readable recording medium for implementing a disclosed method.

According to an aspect there is provided a method for determining a location of a client device in a wireless network including the client device and at least three network devices, each of the three network devices having a known location, said method comprising:

pairwise exchanging messages between at least three different pairs of network devices of said at least three network devices, wherein in a pairwise message exchange a first network device transmits a first message and a second network device receives the first message transmitted from a first network device and transmits a second message to the first network device, said second message including a time difference information of the time difference between reception of a message and subsequent transmission of a message by the second network device, and determining the location of the client device from the known locations of the network devices of the at least three different pairs of network devices, the time difference information carried in pairwise exchanged messages between said at least three different pairs of network devices and times of reception of the pairwise exchanged messages by the client device.

According to a further aspect there is provided a system for determining a location of a client device in a wireless network, the system comprising:

a client device and at least three network devices, each of the three network devices having a known location, which are configured to pairwise exchange messages between at least three different pairs of network devices of said at least three network devices, wherein in a pairwise message exchange a first network device transmits a first message and a second network device receives the first message transmitted from the first network device and transmits a second message to the first network device, said second message including a time difference information of the time difference between reception of a message and subsequent transmission of a message by the second network device, and wherein the client device or an external device coupled with the client device is configured to determine the location of the client device from the known locations of the network devices of the at least three different pairs of network devices, the time difference information carried in pairwise exchanged messages between said at least three different pairs of network devices and times of reception of the pairwise exchanged messages by the client device.

According to an aspect there is provided a client device configured to determine its location in a wireless network including the client device and at least three network devices, each of the three network devices having a known location, the client device comprising a receiving unit configured to receive messages exchanged in a pairwise message exchange between at least three different pairs of network devices of said at least three network devices and to record the time of reception of said messages, wherein in a pairwise message exchange a first network device transmits a first message and a second network device receives the first message transmitted from the first network device and transmits a second message to the first network device, said second message including a time difference information of the time difference between reception of a message and subsequent transmission of a message by the second network device, and a location determination unit configured to determine the location of the client device from the known locations of the network devices of the at least three different pairs of network devices, the time difference information carried in pairwise exchanged messages between said at least three different pairs of network devices and the recorded times of reception of the pairwise exchanged messages.

According to an aspect there is provided a location determination method for determining the location of a client device in a wireless network including the client device and at least three network devices, each of the three network devices having a known location, the method comprising receiving messages exchanged in a pairwise message exchange between at least three different pairs of network devices of said at least three network devices and to record the time of reception of said messages, wherein in a pairwise message exchange a first network device transmits a first message and a second network device receives the first message transmitted from the first network device and transmits a second message to the first network device, said second message including a time difference information of the time difference between reception of a message and subsequent transmission of a message by the second network device, and determining the location of the client device from the known locations of the network devices of the at least three different pairs of network devices, the time difference information carried in pairwise exchanged messages between said at least three different pairs of network devices and the recorded times of reception of the pairwise exchanged messages.

According to an aspect there is provided a network device for use in a wireless network including a client device and at least three network devices, each of the three network devices having a known location, the network device comprising a receiving unit configured to receive a first message transmitted from another network device, with which a pairwise message exchange is performed, and a transmission unit configured to transmit a second message to the other network device, said second message including a time difference information of the time difference between reception of a message and subsequent transmission of a message by the network device.

According to an aspect there is provided a method of operating a network device in a wireless network including a client device and at least three network devices, each of the three network devices having a known location, the method comprising receiving a first message transmitted from another network device, with which a pairwise message exchange is performed by the network device, and transmitting a second message to the other network device, said second message including a first time difference information of the time difference between reception of a message and subsequent transmission of a message by the network device.

According to still further aspects a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Further embodiments are defined in the dependent claims. It shall be understood that the disclosed system, the disclosed client device, the disclosed network device, the disclosed methods, the disclosed computer program and the disclosed computer-readable recording medium have similar and/or identical further embodiments as the claimed method for determining a location of a client device in a wireless network and as defined in the dependent claims.

One of the aspects of the disclosure is to make use of a very efficient protocol which defines a pairwise message exchange between network devices with known location. Thereby, the transmitted messages comprise essential characteristic timing information, in particular time difference information of the time difference between reception of a message and subsequent transmission of a message by a network device, which enables the client device (which generally is also a wireless device within the network) to determine its position by listening to the message exchange only. For instance, the client device receives messages exchanged between a pair of network devices and records the times at which it receives said messages and/or the time difference between the reception of two messages subsequently transmitted by different network devices. This information is then used, by the client device itself or by another entity (e.g. an external server or computer or an element of a cloud), to determine the location of the client device).

Compared to known methods, an increase in measurement rate and less data traffic are achieved simultaneously. Furthermore, energy and medium capacity may be saved. Further, the wireless devices may optionally be able to actively influence the attainable positioning accuracy.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
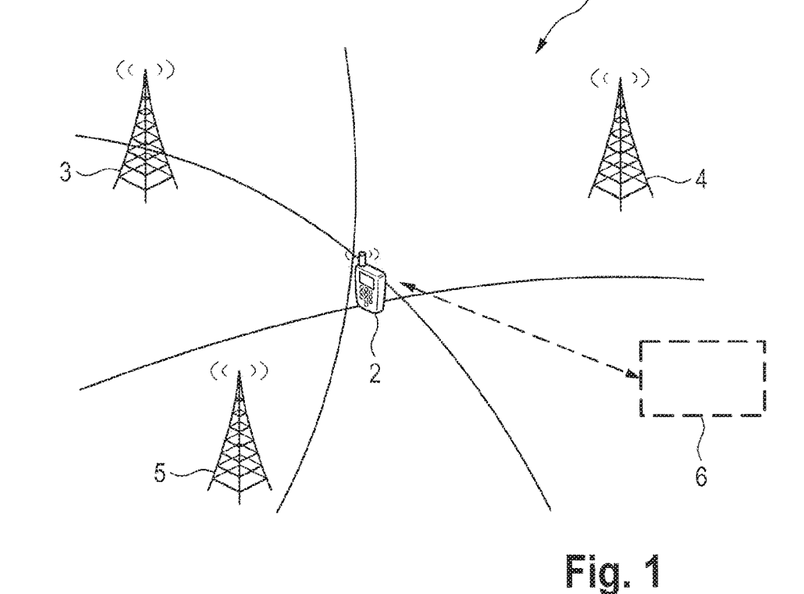
FIG. 1 shows a schematic diagram of a first embodiment of a system according to the present disclosure.

Referring now to the drawings, wherein like reference numerals designate identical or corresponding parts throughout the several views, FIG. 1 shows a schematic diagram of a first embodiment of a system 1 according to the present disclosure. The system 1 particularly comprises a client device 2 and at least three network devices 3, 4, 5 connected through a network. According to the present disclosure the location of the client device 2 shall be determined, which is particularly challenging in indoor scenarios (e.g. in a shopping mall, a train station, a sports arena, a concert hall, etc.). Hereby, determining the location may be understood as determining the absolute position (e.g. with GPS coordinates) and/or the relative position (e.g. within as close environment and/or relative to fixed orientation points such as the network devices).

The client device 2 (also called station (STA) herein) may be any mobile device, whose location shall be determined and which is able to at least listen to messages exchanged between the network devices 3, 4, 5. Examples of such a client device 2 are a mobile station, such as a smartphone, a tablet, a laptop, a WiFi/WLAN enabled device. The client device 2 may also be able to communicate with other client devices and/or with one or more network devices 3, 4, 5 within the same network or with external devices, e.g. being part of another network.

The network may be any network enabling wireless transmission of messages, such as any WiFi (WLAN) network, any communications network (e.g. 3GPP, UMTS, LTE, etc.), Bluetooth, Zigbee, or any microcell network.

The network devices 3, 4, 5 (also called access points (AP) herein) may generally be any devices that are able to communicate (i.e. transmit and receive messages) over the network. Examples of such network devices may be routers, repeaters, access points, base stations, relay stations, WiFi/WLAN enabled devices. Generally, each of said network devices 3, 4, 5 has a known location (i.e. a location which is known to or can be determined by the client device 2). In embodiments the network devices 3, 4, 5 are arranged at a fixed location, but generally may also be movable.

The network devices 3, 4, 5 are configured to pairwise exchange messages between at least three different pairs of network devices 3, 4, 5. Hereby, a pairwise message exchange shall be understood that two network devices (forming a pair) exchange messages. The three network devices 3, 4, 5 can thus be used to form three different pairs (3+4, 3+5, 4+5), which pairwise exchange messages between them (i.e. messages are exchanged between network devices 3 and 4, between network devices 3 and 5 and between network devices 4 and 5). It is, however, not required that a network device is part of more than one pair; three pairs may also be formed by more than three network devices, so that in some or all pair different network devices are used. Further, the number of pairs is not limited to three; there may be (many) more pairs than three, who pairwise exchange messages, to which the client device 2 can listen and which can be used for the determination of the location of the client device 2.

In the following, the present disclosure will be explained with reference to network communication protocols illustrating a pairwise message exchange between a single pair of network devices. The pairwise message exchange between other pairs of network devices is generally performed in the same or similar way.

Figure 2:
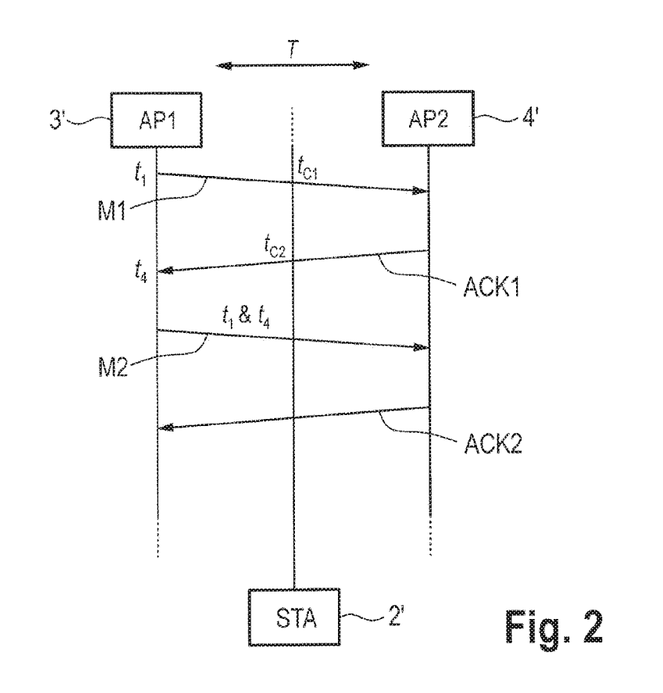
FIG. 2 shows a network communications diagram illustrating a known method for determining the location of the client device.

FIG. 2 shows a network communications diagram illustrating a known method for determining the location of the client device 2' as disclosed in US 2014/0187259 A1. In contrast to the above mentioned FTM method, this TDoA (time-difference-of-arrival) method considers a message exchange between two APs (AP1, AP2) 3', 4' (i.e. network devices). The station(s) (STA) 2' (i.e. the client device(s)) listen(s) to this communication only. The basic procedure is as follows.

At point in time $t_1$, AP1 (i.e. the first network device 3') broadcasts a first message M1. Thereby, $t_1$ denotes the time-of-departure (ToD) of the message M1 at the antenna connector of AP1. Message M1 is received at AP2 (i.e. the second network device 4'), which responds with a first acknowledge message ACK1. This ACK1 message is received by AP1 at point in time $t_4$ with $t_4$ being the time-of-arrival (ToA) at the antenna connector of AP1.

Subsequently, AP1 broadcasts a second message M2 including $t_1$ and $t_4$ to AP2, which responds with a second acknowledge message ACK2. The STA (i.e. the client device 2') listens to the message exchange and retrieves the time measurements $t_{C1}$ and $t_{C2}$, representing the points in time (i.e. the ToA), at which the first message M1 and the first acknowledgement message ACK1, respectively, have been received by the STA. Further, by listening to the first and second messages M1, M2, the STA also receives $t_1$ and $t_4$ which are broadcasted from AP1. With this information, the STA can compute the TDoA between message M1 and the first acknowledgement message ACK1 by $$\Delta TOF = t_{C1} - [t_{C2} - (t_4 - t_1 - T)],$$

wherein T denotes the TOF between AP1 and AP2. The $\Delta$TOF measurement can be used for positioning using hyperbolic localization or multilateration as e.g. described in J. Figueiras and S. Frattasi, Mobile Positioning and Tracking: From Conventional to Cooperative Techniques, John Wiley & Sons, 2010, particularly chapter 4.4.

The method illustrated in FIG. 2 has various drawbacks. It requires one master AP (which is AP1 in FIG. 2), which initiates the message exchange and broadcasts the timestamps ($t_1$ and $t_4$ in FIG. 2), whereby it is not defined how the master AP is determined. Further, it requires various messages (M1, M2, ACK1, ACK2 in FIG. 2) which are used for management but not for positioning, which causes a large data traffic overhead. Still further, it exchanges absolute timestamps ($t_1$ and $t_4$ in FIG. 2), which require a large amount of data bits in binary representation. Consequently, data messages containing those timestamps are rather long which results in both a huge data traffic and low positioning accuracy because of the devices' clock drift. Still further, it requires the transmission of four messages for retrieving a single positioning measurement, i.e. the efficiency is rather low. Finally, it requires a continuous message exchange between the APs so that positioning related data traffic is always present although it may be not required.

Figure 3:
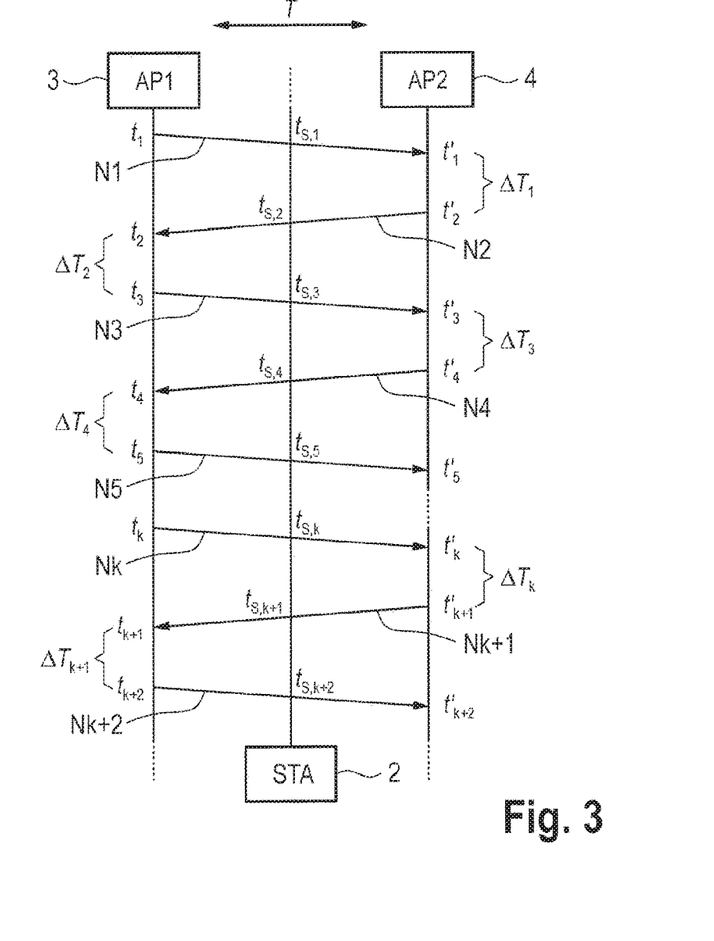
FIG. 3 shows first embodiment of a network communications diagram for illustrating a first embodiment of a method according to the present disclosure.

The solution of the present disclosure considers these drawbacks and offers significant improvements. It relies on a different message exchange, which is schematically shown in a first embodiment in FIG. 3. The message labeling is, as indicated in FIG. 3, such that the k-th message Nk holds the timestamps $t_k$ (representing the time when the message Nk has been sent by the transmitting AP (network device)), $t'_k$ (representing the time when the message Nk has been received by the receiving AP (network device)) and $t_{S,k}$ (representing the time when the message Nk has been received by the STA (client device)).

The basic procedure is as follows: At ToD $t_1$, AP1 broadcasts the first message N1 which is received by AP2 at ToA $t'_1$. After the first message N1 has been received, AP2 broadcasts the second message N2 at ToD $t'_2$ which is received by AP1 at ToA $t_2$. This message exchange may be continuously repeated as indicated in FIG. 3. The APs compute the time difference $\Delta T_k$ between ToD and ToA of successive messages, i.e.

$$\Delta T_k = \begin{cases} t_{k+1} - t_k & AP1 \\ t'_{k+1} - t'_k & AP2 \end{cases}$$

The content of the exchanged messages comprise $\Delta T_k$. The time information $\Delta T_k$ may be included in the data field of the frame. Thus, AP and STA can obtain this information by demodulation and decoding algorithms for conventional use. Depending on the required accuracy and processing time in the device between receiving and transmitting a message, the time resolution and maximum time which is supported is defined for the timestamp format of $\Delta T_k$. E.g. for a time resolution of 0.1 ns and a maximum allowed processing time in the device between reception and transmission of a message of e.g. 100 ms, a 30 bit field may be defined for $\Delta T_k$ to define $2^{30}$ possible timestamps (which are roughly in between 0 and 100 ms in 0.1 ns raster). Thus, in the embodiment shown in FIG. 3, the second message N2 sent by AP2 contains $\Delta T_1$, the third message N3 contains $\Delta T_2$ etc. It should be noted that a message can only contain a $\Delta T_k$ value if the AP received a message previously transmitted by the other AP. Thus, the very first message N1 within the message exchange holds no information about $\Delta T_k$.

The STA(s) listen(s) to the exchanged messages Nk (FIG. 3 depicts a single exemplary STA, but there can be more than one STAs making use of the same message exchange). In particular, the STA does not actively influence the message exchange. The first message N1 which has been broadcasted by AP1 is received by the STA at ToA $t_{S,1}$ (also called "time of reception" herein) Similarly, the second message N2 sent by AP2 is received at ToA $t_{S,2}$ etc. The STA(s) may further not only receive the pairwise exchanged messages, but may also demodulate and decode these messages to get the time difference information $\Delta T_k$ in addition to the time of arrival of those messages. However, the STA(s) are generally not actively involved in the pairwise message exchange.

The reception time information $t_{S,k}$ (measured by the STA) and the time difference information $\Delta T_k$ (retrieved by the STA from the exchanged message Nk+1) can be used by any STA to compute a TDoA measurement for k>1 according to $$\Delta TOF = \begin{cases} t_{S,k} - t_{S,k-1} - T - \Delta T_{k-1} & k \text{ even} \\ t_{S,k-1} - T_{S,k} + T + \Delta T_{k-1} & k \text{ odd} \end{cases}$$

Thereby, it is assumed that T, which is the time-of-flight (TOF) between AP1 and AP2, is known by the STA (e.g. derived from the know positions of the APs, as explained below). Thus, in contrast to the known methods, in particular the method explained above with reference to FIG. 2, a $\Delta TOF$ measurement value can be obtained at every step k in steady state, i.e. after each transmission of a message Nk. Thus, a two-fold increase in measurement rate compared to the method known from US 2014/0187259 A1 is achieved.

In an embodiment the difference between the ToA of two messages (e.g. the messages N2 and N3), which have been sent from two APs synchronously, is used in the calculation of $\Delta TOF$. Obviously, the messages (e.g. the messages N2 and N3) in FIG. 3 are sent asynchronously. Therefore, the equation above defining $\Delta TOF$ holds a correction term $T+\Delta T_{k-1}$, which is the period of time in between the messages (e.g. the messages N2 and N3) from AP2 and AP1 or vice versa. For example, the transmission of the third message N3 in FIG. 3 is delayed by $T+\Delta T_2$ compared to the transmission of the second message N2.

Additionally, the disclosed TDoA positioning method requires a reference AP, i.e. the ToA of messages are referred to a dedicated AP. From a mathematical point of view, this means for example that the ToA of messages from AP1 are always subtracted from the ToA of messages from AP2 or vice versa. If the subtraction is inversely performed, i.e. ToA of messages from AP2 are subtracted from ToA of messages from AP1, the sign of $\Delta TOF$ changes. For this reason, the $\Delta TOF$ equation above features a case-by-case definition which considers the sign change. Thus, the $\Delta TOF$ measurements obtained with the equation above have always the same sign. As the reference AP can be chosen arbitrarily, the labeling of the cases in the equation above is exemplary and can be inverted, i.e. the even label and the odd label can be interchanged. However, the labeling should be unchanged during an entire measurement period.

For determining the location of the STA, the $\Delta TOF$ measurement values may be used for TDoA positioning using e.g. hyperbolic localization or multilateration as described in the above cited book of J. Figueiras et al., particularly chapter 4.4, which is herein incorporated by reference. For instance, in hyperbolic localization link lengths are estimated using TDOA measurements. Since these types of measurements do not depend on the link length but on the difference between two measures of link lengths, the TDOA measurements describe a hyperbola as the possible location of the user position (which can also be seen from FIG. 1). For a 2D space, it is possible to estimate the (x, y) position of the STA from a system of equations with three different TDOA readings. Similarly to the lateration technique, hyperbolic localization is subject to the problem of non-intersecting curves. The same approaches as those used to solve the problem in the case of triangulation can be used in this case. Thus, assuming that TDOA measurements $t_{S,i}$ result in a difference of distances $d_i$ between APs, the problem can be solved by $$d_i = d_i - d_1,$$

$$(d_i + d_1)^2 - d_i^2,$$

$$d_i^2 + 2d_i d_1 = x_i^2 + y_i^2 - x_1^2 - y_1^2 - 2x(x_i - x_1) - 2y(y_i - y_1).$$

These equations can be written in matrix notation as HX=B, wherein $$X = [X^T, d_1]^T,$$

$$H = \begin{bmatrix} x_2 - x_1 & y_2 - y_1 & d_2 \\ x_3 - x_1 & y_3 - y_1 & d_3 \\ \vdots & \vdots & \vdots \\ x_n - x_1 & y_n - y_1 & d_n \end{bmatrix},$$

$$B = \frac{1}{2} \begin{bmatrix} (x_2^2 + y_2^2) - (x_1^2 + y_1^2) - d_2^2 \\ (x_3^2 + y_3^2) - (x_1^2 + y_1^2) - d_3^2 \\ \vdots \\ (x_n^2 + y_n^2) - (x_1^2 + y_1^2) - d_n^2 \end{bmatrix}.$$

The solution is then give by $X = (H^T H)^{-1} H^T B$.

The following properties can be observed. The disclosed TDoA positioning method requires at least three independent $\Delta TOF$ measurements from different AP pairs, i.e. the measurement procedure shown in FIG. 3 is performed between at least three different AP pairs. From each different AP pair at least one $\Delta TOF$ measurement value is required. Therefore, each AP should to be able to communicate to each other AP and should perform a (pairwise) message exchange as depicted in FIG. 3, wherein it is generally sufficient if a single pair of messages is exchanged between each pair of APs. The pairwise message exchange between the APs of the different pairs may be done alternately or (partly or fully) overlapping in time, in which case different codes and/or frequencies are preferably used by the different pairs of APs for the message exchange. If the location of the STA in 3D shall be determined, at least one ΔTOF measurement value is required from four different AP pairs.

Furthermore, the disclosed TDoA positioning method requires the location of the APs. Therefore, the APs broadcast their location or any other position related information in dedicated messages (not shown in FIG. 3) or in one or more of the messages used in the pairwise message exchange. Still further, in an embodiment the computation of ΔTOF requires T which can be deduced from the AP locations by T=d/co, with d denoting the distance between the APs (which can be computed from the AP locations) and co being the speed of light.

The STA can either perform the positioning itself or send the required data to an external device 6 (e.g. a location server as shown in broken lines as an option in FIG. 1 or to an entity (e.g. a computer) in a cloud)) which executes the required computations and returns the position to the STA. This also holds for the evaluation of ΔTOF. This may help to offload computational complexity from the STA. In this case, the broadcast messages that indicate the AP positions are not needed if an external device 6 (e.g. the location server) is aware of the APs' positions.

Moreover, the result of the disclosed TDoA positioning method can be combined with positioning results from other methods in order to improve accuracy. Other methods include, for example, angular positioning methods like angle-of-departure (AoD) and/or angle-of-arrival (AoA) of the wireless signal or the known FTM.

In general, the accuracy of the disclosed TDoA positioning estimates improves the more accurate and the smaller the $\Delta T_k$ measurements are. In the latter case, accuracy is improved because the inherent time-drift of the internal clocks of the APs and the STA(s) has less influence on the position estimate. On the other hand, the APs can actively influence the positioning accuracy likewise. If the APs broadcast an altered $\Delta T^*_k \approx \Delta T_k$, the positioning estimate deteriorates. Similarly, the APs can choose $\Delta T_k$ to be large.

Figure 4:
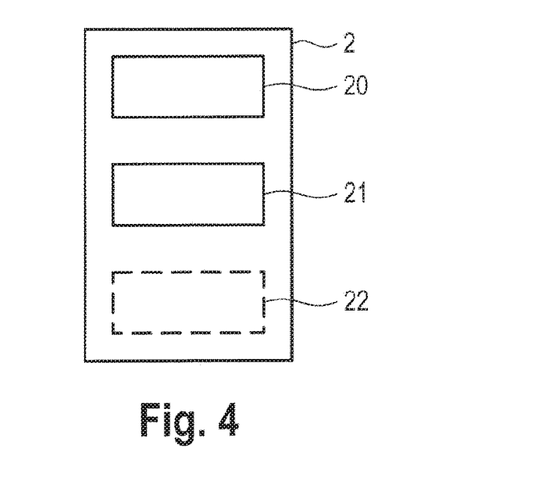
FIG. 4 shows a schematic diagram of a client device according to the present disclosure.
Figure 5:
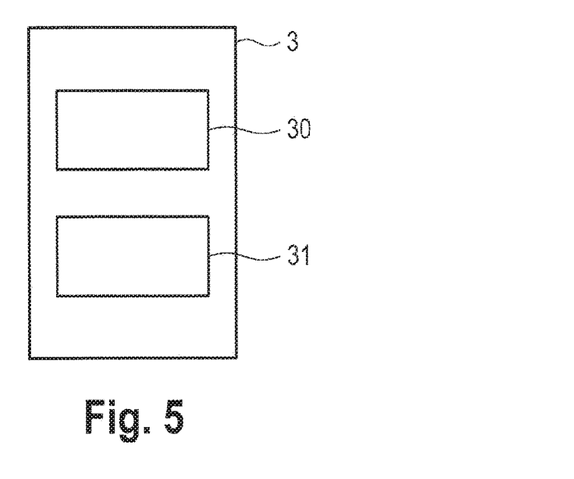
FIG. 5 shows a schematic diagram of a network device according to the present disclosure.

FIG. 4 shows a schematic diagram of a client device 2 according to the present disclosure, and FIG. 5 shows a schematic diagram of a network device 3 (the network device 4, 5 are similar or identical) according to the present disclosure.

The client device 2, e.g. a smartphone, comprises a receiving unit 20 configured to receive messages exchanged in a pairwise message exchange between at least three different pairs of network devices of said at least three network devices and to record the time of reception of said messages. The receiving unit may e.g. comprise an antenna and necessary electronics for signal reception in the wireless network, e.g. a WiFi/WLAN antenna, RF antenna, etc. Further, the client device 2 comprises a location determination unit 21 configured to determine the location of the client device 2 from the known locations of the network devices of the at least three different pairs of network devices, the time difference information carried in pairwise exchanged messages between said at least three different pairs of network devices and the recorded times of reception of the pairwise exchanged messages. Alternatively or in addition, a communication interface 22 may be provided for communication with an external device (6 in FIG. 1, e.g. a location server) to communicate the required data for calculating the location of the client device 2 to the external device 6 and to receive the calculated location from the external device 6.

The network device 3 comprises a receiving unit 30 configured to receive a first message transmitted from another network device, with which a pairwise message exchange is performed, and a transmission unit 31 configured to transmit a second message to the other network device, i.e. units 30, 31 to perform the disclosed pairwise message exchange with another network device. The receiving unit 30 and the transmission unit 31 may be a collocated antenna or a pair of antennas configured for communicating in the respective network with other network devices.

Figure 6:
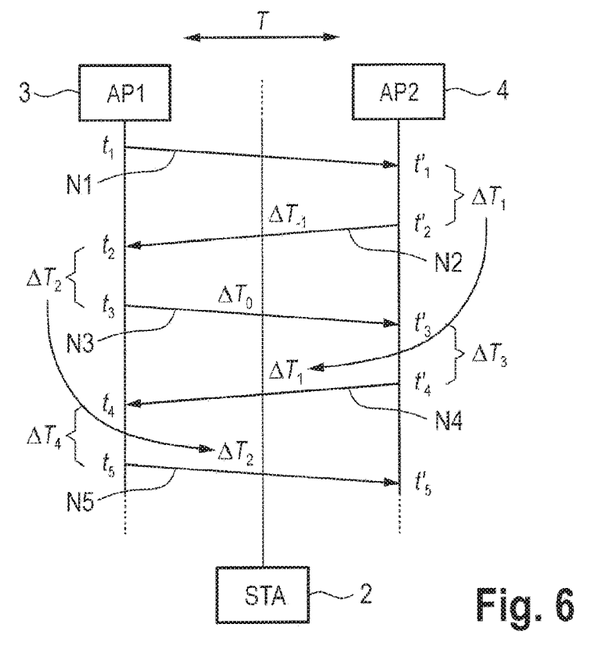
FIG. 6 shows a second embodiment of a network communications diagram for illustrating a second embodiment of a method according to the present disclosure.

FIG. 6 shows a second embodiment of a network communications diagram for illustrating a second embodiment of a method according to the present disclosure. Here, the message Nk, which is broadcasted at k, comprises $\Delta T_{k-3}$ instead of $\Delta T_{k-1}$ (e.g. N5 carries $\Delta T_2$ instead of $\Delta T_4$. In practical implementations, it may be difficult to broadcast $\Delta T_{k-1}$ at k, because computation of $\Delta T_{k-1}$ requires the ToD of the message which contains $\Delta T_{k-1}$ already. Hence, a prediction algorithm or a calibration could be used. The insertion of a delay as shown in FIG. 6, however, avoids the use of such a prediction algorithm or calibration. In general, the delay of $\Delta T_{k-1}$ is not limited to two as shown in FIG. 6, but can be any even and positive number including zero.

Figure 7:
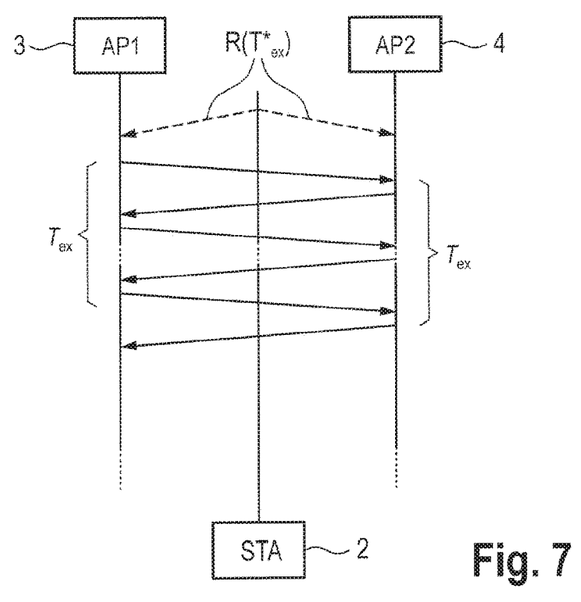
FIG. 7 shows a third embodiment of a network communications diagram for illustrating a third embodiment of a method according to the present disclosure.

FIG. 7 shows a third embodiment of a network communications diagram for illustrating a third embodiment of a method according to the present disclosure. In this embodiment an optional request message R is used, which can be sent by any STA to the APs. This message R enables the message exchange between the APs for a certain period of time $T_{ex}$. $T_{ex}$ can be either set by the APs or proposed by the STA depending on the requirements of the positioning accuracy. In the latter case, the request message R may hold the proposed value $T^*_{ex}$. The APs can either set $T_{ex}=T^*_{ex}$ or set $T_{ex}$ to any other value based on the AP configuration. In particular, the APs can ignore requests from STAs if appropriate. Additionally, the APs are free to initiate a message exchange at any time for any duration. FIG. 7 illustrates the proposed request message R and the subsequent message exchange. Before a STA requests a message exchange, it is optionally required to listen to the wireless medium for a certain period of time to assure that an ongoing message and a recent upcoming message exchange is detected.

The WLAN standard comprises several message acknowledgement (ACK) principles. Two of them can make sense in the context of the present disclosure and may be used in embodiments. According to the embodiments shown in FIGS. 3 and 6 no ACK or explicit ACK is used. The APs respond with a message which comprises $\Delta T_k$ and which is simultaneously an ACK that the previous message arrived.

Another embodiment of a network communications diagram for illustrating a fourth embodiment of a method according to the present disclosure using explicit ACK is shown in FIG. 7. According to this embodiment an AP transmits a (small) ACK message after each received message N, i.e. the measurement protocol is different as in FIGS. 3 and 6. Generally, the ACK carries no further information.

Figure 8:
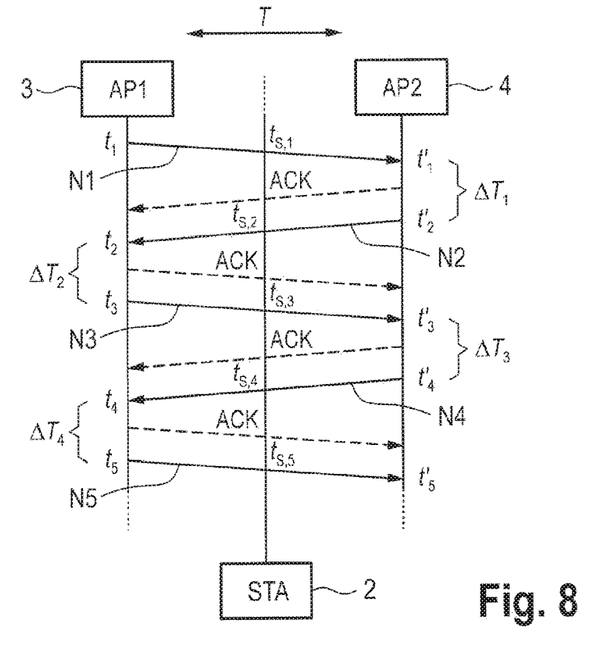
FIG. 8 shows a fourth embodiment of a network communications diagram for illustrating a fourth embodiment of a method according to the present disclosure.
Figure 9:
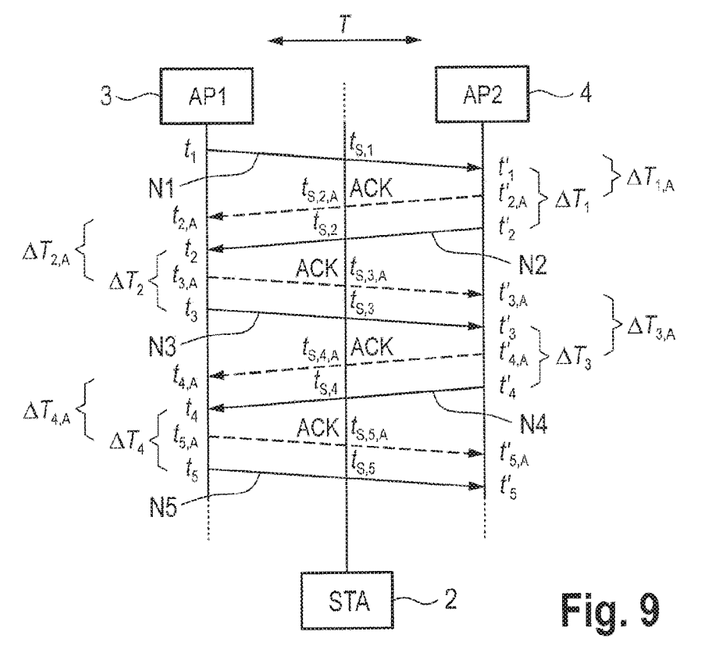
FIG. 9 shows a fifth embodiment of a network communications diagram for illustrating a fifth embodiment of a method according to the present disclosure.

However, the ToD and ToA of the ACK messages in FIG. 8 can be used to compute additional ΔTOF measurements as indicated in FIG. 9 showing a fifth embodiment of a network communications diagram for illustrating a fifth embodiment of a method according to the present disclosure. For k>1 the computation of $\Delta T_{k,A}$ is similar to $\Delta T_k$, but refers to the ToA and ToD of the ACK messages. Since the ACK messages carry no information, the k-th message comprises not only $\Delta T_k$ but also $\Delta T_{k,A}$. Additional ΔTOF measurements deduced from the ACK messages can be retrieved for k>2 by $$\Delta TOF = \begin{cases} t_{S,k,A} - t_{S,k-1,A} - T - \Delta T_{k-1,A} & k \text{ even} \\ -(t_{S,k,A} - T_{S,k-1,A} - T - \Delta T_{k-1,A}) & k \text{ odd} \end{cases}$$

For the ACK of the very first message (k=1), the definition of $\Delta T_{k,A}$ is different, because there is no previous ACK message where ToD $t'_{2,A}$ can be referred to. Therefore, $\Delta T_{1,A} = t'_{2,A} - t'_1$ holds. Moreover, the $\Delta TOF$ for k=2 can be retrieved by $\Delta TOF = t_{S,2,A} - t_{S,1} - T - \Delta T_{k,A}$. This equation may change its sign depending on the reference AP, i.e. the sign should be consistent to the labeling in the equation above.

In summary, according to the present disclosure the measurement protocol requires no master AP. Further, almost every transmitted message contains information related to positioning, i.e. $\Delta T$. Shorter message lengths are achieved since $\Delta T$ is a relative timestamp which requires less data bits in binary representation than absolute timestamps. Therefore, data traffic and the positioning error due to time drift are lower. In steady state, the STA can perform positioning every k, i.e. as soon as a message has been received. Therefore, the measurement rate is increased twofold compared to known methods. This can yield additional positioning accuracy if an appropriate averaging is applied to the measurement results. The STA can send a request message to the APs enabling the message exchange between the APs. This saves both energy and medium capacity in scenarios where the positioning feature is rarely used. Finally, the positioning accuracy can be determined by the APs by altering $\Delta T_k$ and/or by keeping $\Delta T_k$ large. In the latter case, the time drift has a stronger effect on the accuracy of the positioning estimate.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A method for determining a location of a client device in a wireless network including the client device and at least three network devices, each of the three network devices having a known location, the method comprising:

pairwise exchanging messages between at least three different pairs of network devices of said at least three network devices, wherein in a pairwise message exchange a first network device transmits a first message and a second network device receives the first message transmitted from the first network device and transmits a second message to the first network device, said second message including a time difference information of the time difference between reception of a message and subsequent transmission of a message by the second network device, and determining the location of the client device from the known locations of the network devices of the at least three different pairs of network devices, the time difference information carried in pairwise exchanged messages between said at least three different pairs of network devices and times of reception of the pairwise exchanged messages by the client device.

2. The method as defined in any preceding embodiment, wherein the times of reception of the respective first and second messages or of the respective second and third messages by the client device are used in the determination of the location of the client device.

3. The method as defined in any preceding embodiment, wherein the time of flight between the respective two network devices of a pair of network devices performing a pairwise message exchange is used in the determination of the location of the client device.

4. The method as defined in any preceding embodiment, further comprising calculating, per pair of network devices performing a pairwise message exchange, at least one differential time of flight value, wherein a differential time of flight value is calculated from a pair of subsequently transmitted messages, and using said at least one differential time of flight value in the determination of the location of the client device.

5. The method as defined in embodiment 4, wherein a differential time of flight value is calculated by calculating the time difference between the times of reception, at which the two messages of the pair of subsequently transmitted messages are received by the client device, and subtracting therefrom the time difference information of the time difference between reception of the first message and transmission of the second message of said pair of messages.

6. The method as defined in embodiment 5, further subtracting from the calculated time difference between the times of reception the time of flight between the respective two network devices of a pair of network devices performing a pairwise message exchange to obtain the differential time of flight value.

7. The method as defined in any preceding embodiment, wherein the location of the client device is determined by use of a triangulation method, a hyperbolic localization method or a multilateration method.

8. The method as defined in any preceding embodiment, wherein a time difference information carried in a message indicates the time difference between the last received message and the subsequent transmission of a message.

9. The method as defined in any preceding embodiment, wherein a time difference information carried in a message indicates the time difference between the an earlier received message and the directly subsequent transmission of a message.

10. The method as defined in any preceding embodiment, wherein the pairwise exchange of messages is performed continuously, at regular intervals or on request of the client device.

11. The method as defined in any preceding embodiment, wherein in said pairwise message exchange the first network device additionally transmits a first acknowledgement message and the second network device additionally receives the first acknowledgement message transmitted from the first network device and transmits a second acknowledgement message to the first network device, wherein said second message additionally includes an acknowledgement time difference information of the time difference between reception of an acknowledgement message and subsequent transmission of an acknowledgement message by the second network device, wherein the first acknowledgement time difference is additionally used in the determination of the location of the client device.

12. The method as defined in any preceding embodiment, wherein the network devices and the client devices are connected in a wireless local area network, communications network or micro-cells network.

13. The method as defined in any preceding embodiment, wherein in a pairwise message exchange the first network device receives the second message transmitted from the second network device and transmits a third message to the second network device, said third message including a second time difference information of the time difference between reception of a message and subsequent transmission of a message by the first network device.

14. A system for determining a location of a client device in a wireless network, the system comprising
   a client device and
   at least three network devices, each of the three network devices having a known location, which are configured to pairwise exchange messages between at least three different pairs of network devices of said at least three network devices, wherein in a pairwise message exchange a first network device transmits a first message and a second network device receives the first message transmitted from the first network device and transmits a second message to the first network device, said second message including a time difference information of the time difference between reception of a message and subsequent transmission of a message by the second network device, and wherein the client device or an external device coupled with the client device is configured to determine the location of the client device from the known locations of the network devices of the at least three different pairs of network devices, the time difference information carried in pairwise exchanged messages between said at least three different pairs of network devices and times of reception of the pairwise exchanged messages by the client device.

15. A client device configured to determine its location in a wireless network including the client device and at least three network devices, each of the three network devices having a known location, the client device comprising
   a receiving unit configured to receive messages exchanged in a pairwise message exchange between at least three different pairs of network devices of said at least three network devices and to record the time of reception of said messages, wherein in a pairwise message exchange a first network device transmits a first message and a second network device receives the first message transmitted from the first network device and transmits a second message to the first network device, said second message including a time difference information of the time difference between reception of a message and subsequent transmission of a message by the second network device, and
   a location determination unit configured to determine the location of the client device from the known locations of the network devices of the at least three different pairs of network devices, the time difference information carried in pairwise exchanged messages between said at least three different pairs of network devices and the recorded times of reception of the pairwise exchanged messages.

16. A location determination method for determining the location of a client device in a wireless network including the client device and at least three network devices, each of the three network devices having a known location, the method comprising
   receiving messages exchanged in a pairwise message exchange between at least three different pairs of network devices of said at least three network devices and to record the time of reception of said messages, wherein in a pairwise message exchange a first network device transmits a first message and a second network device receives the first message transmitted from the first network device and transmits a second message to the first network device, said second message including a time difference information of the time difference between reception of a message and subsequent transmission of a message by the second network device, and
   determining the location of the client device from the known locations of the network devices of the at least three different pairs of network devices, the time difference information carried in pairwise exchanged messages between said at least three different pairs of network devices and the recorded times of reception of the pairwise exchanged messages.

17. A network device for use in a wireless network including a client device and at least three network devices, each of the three network devices having a known location, the network device comprising
   a receiving unit configured to receive a first message transmitted from another network device, with which a pairwise message exchange is performed, and
   a transmission unit configured to transmit a second message to the other network device, said second message including a time difference information of the time difference between reception of a message and subsequent transmission of a message by the network device.

18. A method of operating a network device in a wireless network including a client device and at least three network devices, each of the three network devices having a known location, the method comprising
   receiving a first message transmitted from another network device, with which a pairwise message exchange is performed by the network device, and
   transmitting a second message to the other network device, said second message including a first time difference information of the time difference between reception of a message and subsequent transmission of a message by the network device.

19. A non-transitory computer-readable recording medium that stores therein a computer program product, which, when executed by a processor, causes the method according to any one of embodiments 1 to 14, 16, 18 to be performed.

20. A computer program comprising program code means for causing a computer to perform the steps of said method according to one of the embodiments 1 to 14, 16, 18 when said computer program is carried out on a computer.

The invention claimed is:

1. A method for determining a location of a client device in a wireless network including the client device and at least three network devices, each of the three network devices having a known location, the method comprising:

pairwise exchanging messages between at least three different pairs of network devices of said at least three network devices, wherein in the pairwise exchanging messages, a first network device transmits a first message and a second network device receives the first message transmitted from the first network device, the first network device receives a second message transmitted from the second network device and transmits a third message to the second network device, the second network device transmits a fourth message and the first network device receives the fourth message transmitted from the second network device, the first network device calculates either: (1) a first time difference between transmission of the first message and subsequent reception of the second message, or (2) a second time difference between reception of the second message and subsequent transmission of the third message, the first network device includes, in the third message, first time difference information indicating either the calculated first time difference or the calculated second time difference, the second network device calculates either: (3) a third time difference between reception of the first message and subsequent transmission of the second message, or (4) a fourth time difference between transmission of the second message and subsequent reception of the third message, and the second network device includes either second time difference information indicating the calculated third time difference in the second message, or third time difference information indicating the calculated fourth time difference in the fourth message.

2. The method as claimed in claim 1, further comprising:
determining the location of the client device based on the known locations of the network devices of the at least three different pairs of network devices, at least one of the first time difference information and the second time difference information, and times of reception of the pairwise exchanged messages by the client device.

3. The method as claimed in claim 1, wherein the times of reception of the respective first and second messages by the client device are used in the determination of the location of the client device.

4. The method as claimed in claim 1, wherein a time of flight between the respective two network devices of a pair of network devices performing a pairwise message exchange is used in the determination of the location of the client device.

5. The method as claimed in claim 2, further comprising:
calculating, per pair of network devices performing a pairwise message exchange, at least one differential time of flight value, wherein a differential time of flight value is calculated from a pair of subsequently transmitted messages, and using said at least one differential time of flight value in the determination of the location of the client device.

6. The method as claimed in claim 5, wherein the differential time of flight value is calculated by calculating a time difference between times of reception, at which the two messages of the pair of subsequently transmitted messages are received by the client device, and subtracting therefrom the third time difference.

7. The method as claimed in claim 6, further comprising subtracting from the calculated time difference between the times of reception the time of flight between the respective two network devices of a pair of network devices performing a pairwise message exchange to obtain the differential time of flight value.

8. The method as claimed in claim 1, wherein the location of the client device is determined by use of a triangulation method, a hyperbolic localization method or a multilateration method.

9. The method as claimed in claim 1, wherein the pairwise exchange of messages is performed continuously, at regular intervals or on request of the client device.

10. The method as claimed in claim 1,
wherein in said pairwise message exchange the first network device additionally transmits a first acknowledgement message and the second network device additionally receives the first acknowledgement message transmitted from the first network device and transmits a second acknowledgement message to the first network device, wherein said second message additionally includes acknowledgement time difference information of the time difference between reception of an acknowledgement message and subsequent transmission of an acknowledgement message by the second network device, and wherein the first acknowledgement time difference is additionally used in the determination of the location of the client device.

11. The method as claimed in claim 1, wherein the network devices and the client devices are connected in a wireless local area network, communications network or micro-cells network.

12. A location determination method for determining a location of a client device in a wireless network including the client device and at least three network devices, each of the three network devices having a known location, the method comprising:

receiving messages exchanged in a pairwise message exchange between at least three different pairs of network devices of said at least three network devices and recording time of reception of said messages, wherein in the pairwise message exchange, a first network device transmits a first message and a second network device receives the first message transmitted from the first network device and transmits the second message to the first network device, the first network device receives the second message transmitted from the second network device and transmits a third message to the second network device, the second network device transmits a fourth message and the first network device receives the fourth message transmitted from the second network device, the first network device calculates either: (1) a first time difference between transmission of the first message and subsequent reception of the second message, or (2) a second time difference between reception of the second message and subsequent transmission of the third message, the first network device includes, in the third message, first time difference information indicating either the calculated first time difference or the calculated second time difference, the second network device calculates either: (3) a third time difference between reception of the first message and subsequent transmission of the second message, or (4) a fourth time difference between transmission of the second message and subsequent reception of the third message, and the second network device includes either second time difference information indicating the calculated third time difference in the second message, or third time difference information indicating the calculated fourth time difference in the fourth message.

13. A non-transitory computer-readable recording medium that stores therein a computer program product, which, when executed by a processor, causes the method according of claim 1 to be performed.

14. A second network device for use in a wireless network including a client device and at least three network devices, each of the three network devices having a known location, the second network device comprising:
a receiver configured to receive a first message transmitted from a first network device, with which a pairwise message exchange is performed; and
a transmitter configured to transmit a second message to the first network device, wherein
the receiver is further configured to receive a third message from the first network device,
the transmitter is further configured to transmit a fourth message to the first network device,
the first network device calculates either: (1) a first time difference between transmission of the first message and subsequent reception of the second message, or (2) a second time difference between reception of the second message and subsequent transmission of the third message,
the first network device includes, in the third message, first time difference information indicating either the calculated first time difference or the calculated second time difference,
the second network device calculates either: (3) a third time difference between reception of the first message and subsequent transmission of the second message, or (4) a fourth time difference between transmission of the second message and subsequent reception of the third message, and
the second network device includes either second time difference information indicating the calculated third time difference in the second message, or third time difference information indicating the calculated fourth time difference in the fourth message.

15. A method of operating a second network device in a wireless network including a client device and at least three network devices, each of the three network devices having a known location, the method comprising:
receiving a first message transmitted from a first network device, with which a pairwise message exchange is performed by the second network device;
transmitting a second message to the first network device;
receiving a third message transmitted from the first network device; and
transmitting a fourth message to the first network device, wherein
the first network device calculates either: (1) a first time difference between transmission of the first message and subsequent reception of the second message, or (2) a second time difference between reception of the second message and subsequent transmission of the third message,
the first network device includes, in the third message, first time difference information indicating either the calculated first time difference or the calculated second time difference,
the second network device calculates either: (3) a third time difference between reception of the first message and subsequent transmission of the second message, or (4) a fourth time difference between transmission of the second message and subsequent reception of the third message, and
the second network device includes either second time difference information indicating the calculated third time difference in the second message, or third time difference information indicating the calculated fourth time difference in the fourth message.

* * * * *